United States Patent [19]
Ueda et al.

[11] 3,916,423
[45] Oct. 28, 1975

[54] INFORMATION BEARING ATTACHMENT FOR REPLACEABLE FILM CARTRIDGE

[75] Inventors: Hiroshi Ueda, Nara; Sanjiro Murakami, Komagabaya, both of Japan

[73] Assignee: Minolta Camera Kabushiki Kaisha, Osaka, Japan

[22] Filed: June 6, 1974

[21] Appl. No.: 476,822

[30] Foreign Application Priority Data
June 15, 1973  Japan.............................. 48-67927

[52] U.S. Cl. ............................................... 354/108
[51] Int. Cl.² ........................................ G03B 17/24
[58] Field of Search........................... 354/107, 108

[56] References Cited
UNITED STATES PATENTS

| | | | |
|---|---|---|---|
| 1,396,035 | 11/1921 | Gaisman............................ | 354/108 |
| 1,504,959 | 8/1924 | Leschbrandt...................... | 354/108 |
| 3,618,495 | 11/1971 | Kuhns................................ | 354/107 |

*Primary Examiner*—John M. Horan
*Attorney, Agent, or Firm*—Wolder & Gross

[57] ABSTRACT

A camera is provided with a replaceable film cartridge having a frame delineated window exposed to light, traversing the camera objective and housing photosensitive units which are successively advanced toward registry with the window and the objective focal plane. An information carrying transparent panel is attached to the cartridge to superimpose data or modify the image focussed on the exposed photosensitive unit, the information being in the form of data characters, an image distorting non-planar panel face, a graph grid or other information. The panel may be provided with index elements to depress the face of the exposed unit to compensate for the light refraction of the panel by reason of its refractive index. As applied to the cartridge of a self processing camera, the frame is defined by resilient distortable upstanding ribs, whose inside faces are engaged by elements projecting from the edges of the panel, which registers with the frame.

20 Claims, 8 Drawing Figures

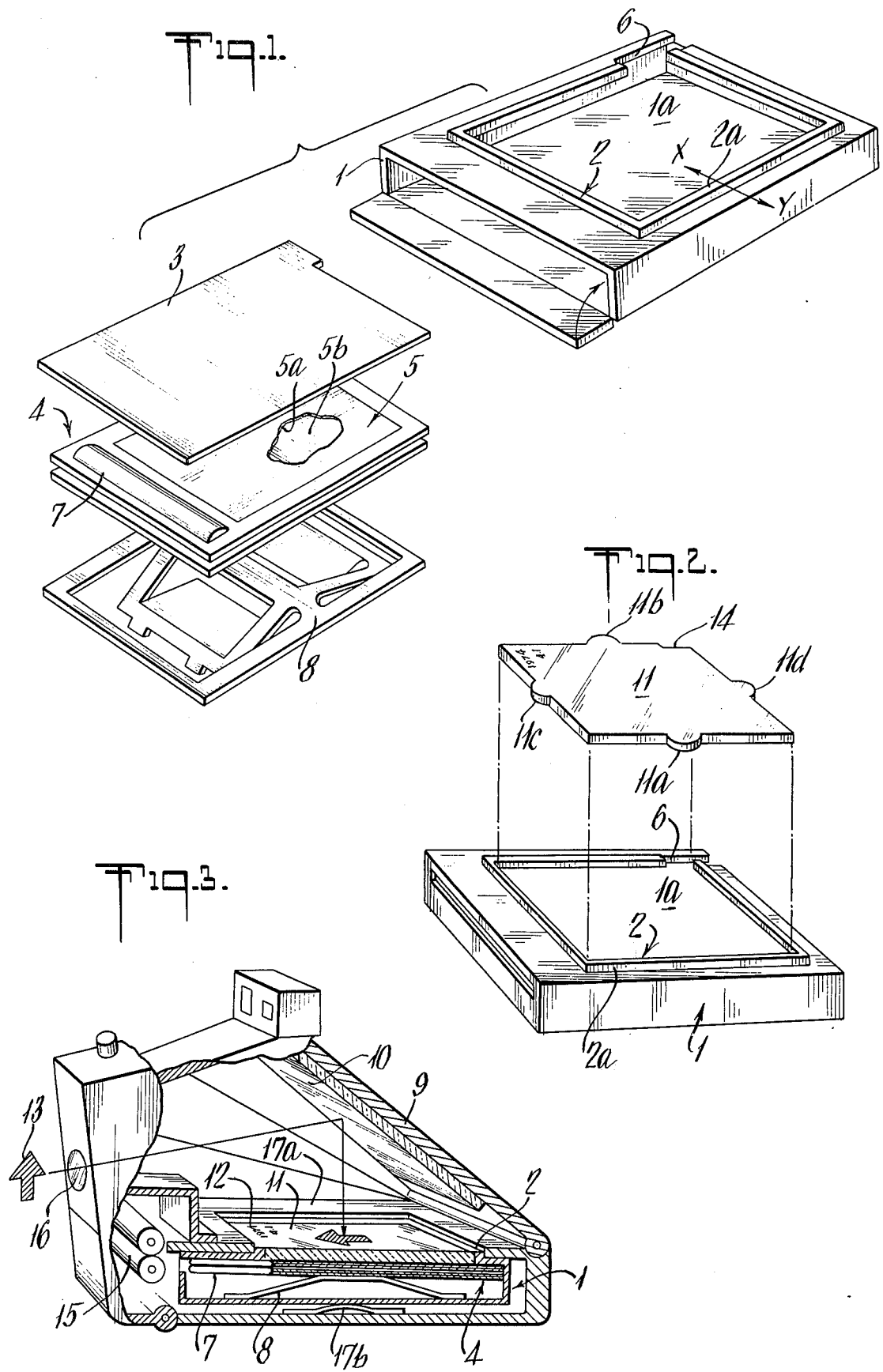

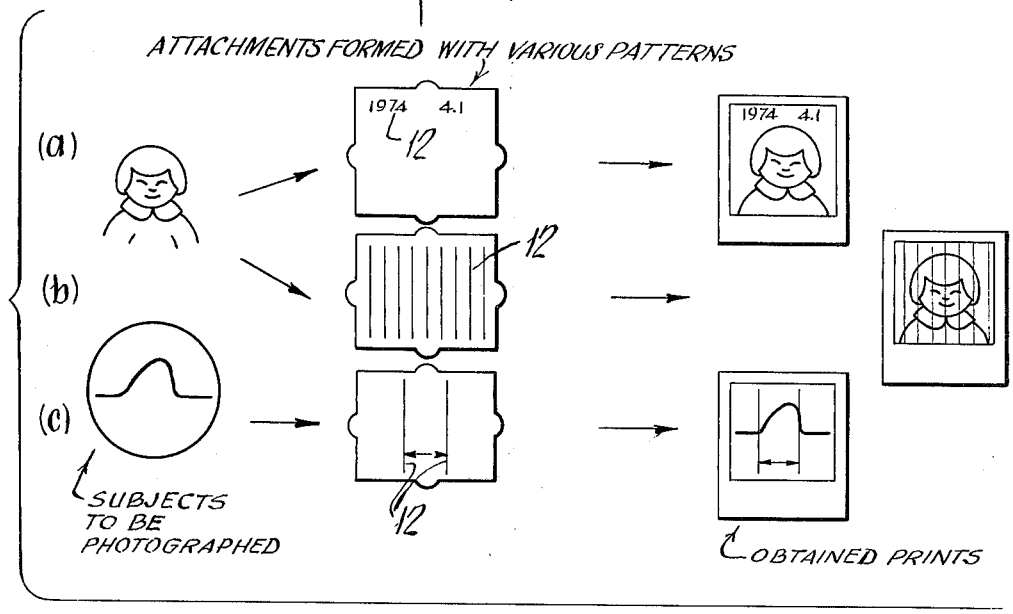
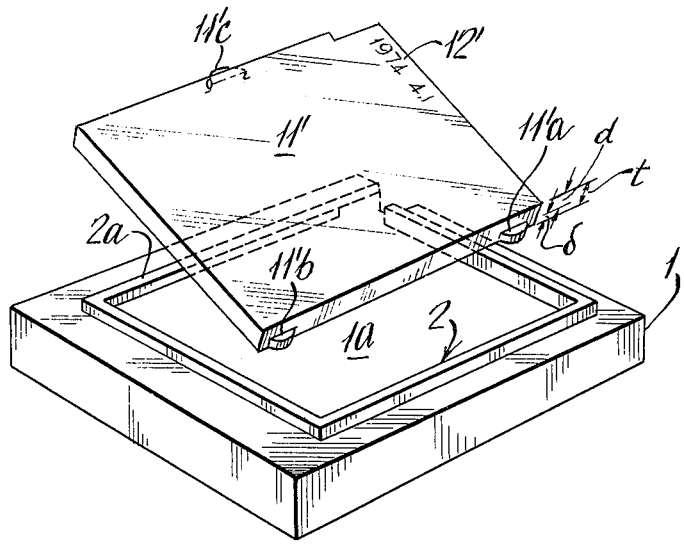
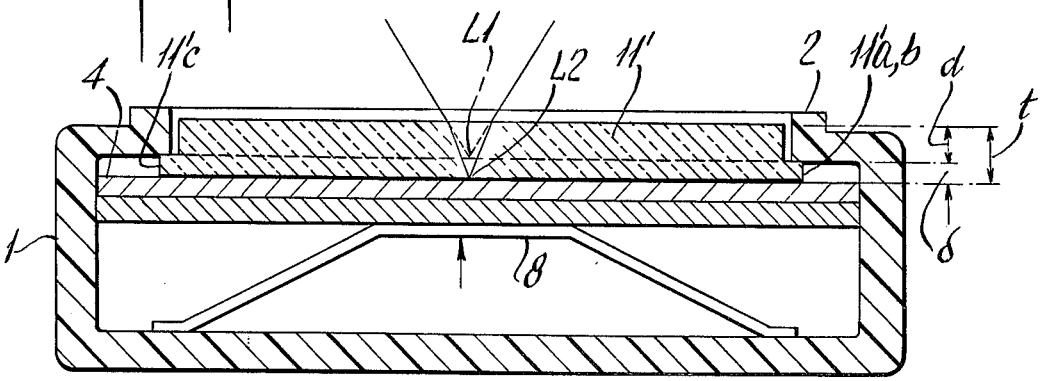

INFORMATION BEARING ATTACHMENT FOR REPLACEABLE FILM CARTRIDGE

BACKGROUND OF THE INVENTION

The present invention relates generally to improvements in cameras and it relates more particularly to an improved camera device which superimposes information on the light image focussed on the camera objective focal plane, such as data, reference grids, image distortion and the like. The improved arrangements is in the form of an accessory which is selectively mounted to the camera by way of being attached to a replaceable cartridge which houses a multiplicity of film units either in a stacked condition or in the form of a wound band, so that successive units are brought into registry with the cartridge window.

Many devices have heretofore been employed and proposed for superimposing an image of characters such as a date or other information on an image of a photographic object on a film. In accordance with a conventional device, a plate having characters such as a date printed thereon is illuminated by the light through a suitable lighting opening in the camera or from a light source such as a lamp, and the light passing through the aforesaid printed plate is projected on a film for exposure. However, this device possesses numerous disadvantages, the necessary mechanism in the camera is highly complicated and hence the device is costly. A printed plate, an illumination opening or a light source must be housed in the casing of the camera, and information other than that printed on the aforesaid plate cannot be projected on the film, since the printed plate cannot readily be replaced.

Another form of the subject type of device employs a transparent tape having characters or other information printed thereon which is introduced through an access opening provided in the casing of a camera to the front of a film being exposed. While this arrangement overcomes some of the drawbacks of the earlier described device, it still suffers from shortcomings in that not only an image of the characters or patterns printed on the tape, but also an image of the edges of the tape are projected on the film, because the width of the tape is smaller than that of the image receiving surface of the film.

SUMMARY OF THE INVENTION

It is accordingly a principal object of the present invention to provide an attachment for a camera, which attachment is adapted to superimpose not only an image of a desired pattern of specific characters, but also that of various desired patterns or information on an image of a photographic object projected on a film, or to modify an image of a photographic object in a desired manner without complicating the mechanism inside a camera casing.

It is another object of the invention to provide an attachment for use with a camera, which attachment is adapted to superimpose not only an image of a desired pattern of specific characters, but also that of various desired patterns on the image of a photographic object projected on a film, or to modify the image of a photographic object, and which attachment obviates any superimposition of unwanted images on the film.

The above and other objects of the present invention are readily attained by utilizing a commercially available exchangeable film cartridge or package having a resiliently deformable frame surrounding or defining a rectangular window having a size corresponding to that of the focussed image on the plane of the film. More particularly, an accessory or attachment forming an element of a preferred embodiment of the present invention consists of a transparent panel or plate, one of the surfaces of which has a two-dimensional or three-dimensional pattern printed thereon, or otherwise carried thereby, and is of a size substantially the same as that of the aforesaid window. In addition, the attachment has projections extending to a small extent from the peripheral edges of the transparent plate, the projections being adapted to elastically or resiliently deform the window frame, when the transparent plate is brought or inserted into frictional engagement with the frame.

In accordance with another embodiment of the present invention, the attachment consists of a transparent plate on one of the surfaces of which is printed or otherwise formed a two-dimensional or three-dimensional pattern, and which is of a size substantially the same as that of the cartridge window. The transparent plate has projections whose respective surfaces on one side coplanar with one surface of the transparent plate. The attachment is mounted through the cartridge window, with the frame being elastically outwardly deformed, but in such a manner that the projections are concealed by the inner edges of the frame. The attachment is urged by the film under the influence of biasing means provided in the cartridge so that the attachment is located in a position where the surfaces of the projections which are opposite to the surfaces thereof which are coplanar with a surface of the transparent plate abut the inner surfaces of the frame. The arrangement of the attachment according to the present invention which may be mounted to the film cartridge does not complicate the mechanism inside the camera casing. Accordingly, if a plurality of attachments having various two-dimensional or three-dimensional patterns are prepared beforehand, then the images of the desired patterns may be superimposed on the images of the photographic objects focussed on film or the image of a photographic object may be modified in a desired manner. Furthermore, since the size of the attachment is substantially the same as that of the magazine window, the edges of the attachment do not produce any image on the film.

The above and other objects and advantages of the present invention will become apparent from a reading of the following description of the preferred embodiments taken in conjunction with the accompanying drawings.

BRIEF DESCRIPTION OF THE DRAWINGS

FIG. 1 is an exploded, perspective view of an exchangeable cartridge for use in a self-processing camera;

FIG. 2 is a perspective view of an attachment in accordance with a first embodiment of the present invention, shown together with the cartridge illustrated in FIG. 1;

FIG. 3 is a fragmentary, perspective view of a self-processing camera, in which the cartridge of FIG. 1 mounting the attachment of FIG. 2 is housed in the camera;

FIG. 4 are views illustrating the relationship between various patterns carried by the attachment and the images of photographic objects projected on the film;

FIG. 5 is a perspective view of an attachment according to a second embodiment of the present invention, together with the cartridge of FIG. 1;

FIG. 6 is a transverse cross-sectional view of the coupled cartridge and attachment of FIG. 5;

DESCRIPTION OF THE PREFERRED EMBODIMENTS

Figure 7:
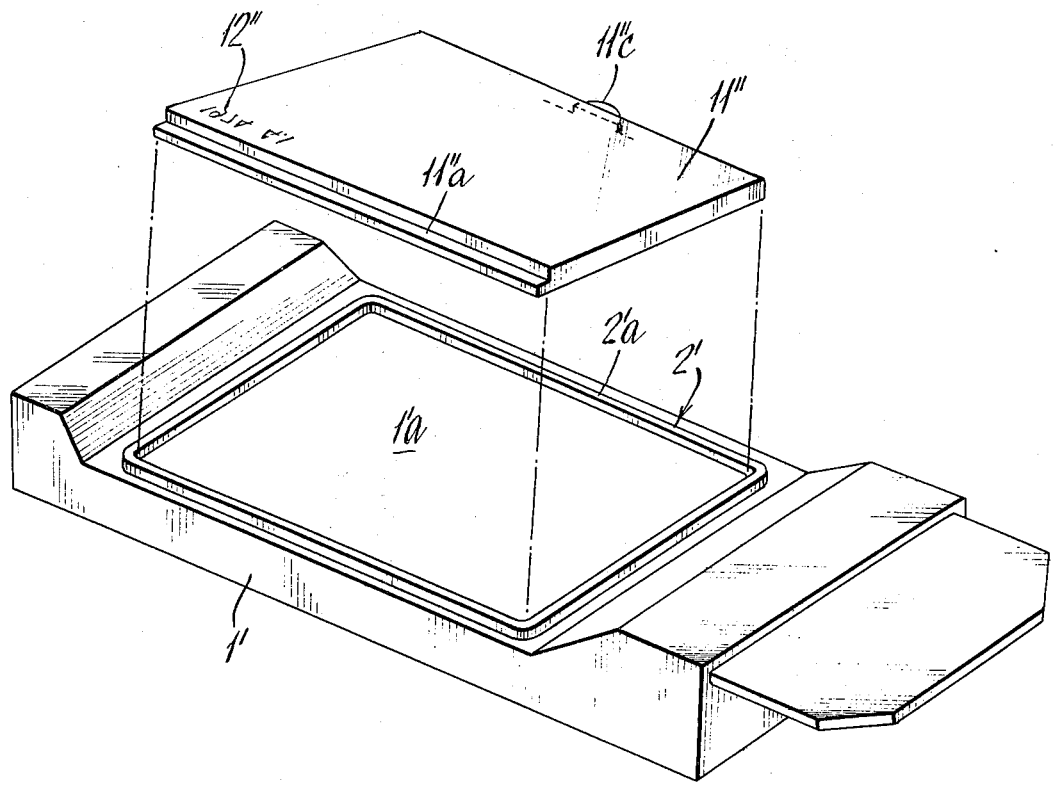
FIG. 7 is a perspective view of an attachment according to a third embodiment of the present invention, shown together with an exchangeable cartridge of a type different from that shown in FIG. 1, which package is adapted to be used in the self-processing camera shown in FIG. 3.

Referring now to the drawings, particularly FIG. 1 to 4 thereof which illustrate a preferred embodiment of the present invention as applied to a self-processing camera employing a film cartridge containing a stack of film units provided with receptacles containing a processing composition such as developing and fixing agents, the receptacles being ruptured following exposure and discharge of a film unit to effect the processing of the film and the production of a finished photograph, generally in the form of an opaque positive. The individual film unit in such a cartridge is of large area and is thus well adapted for use with the attachment of the present invention, the cartridge being provided with a large rectangular window for exposure of the film, so that the coupling and separation of the attachment are readily and easily accomplished.

The film cartridge employed with the self-processing camera includes a casing 1 provided in its front wall with a rectangular exposure window 1a surrounded by an upstanding peripheral rectangular frame 2 coinciding with the edges of the window 1a. The legs 2a of the frame 2 may be transversely elastically or resiliently deformed in the direction of the applied force, in the direction of the arrows X and Y. A removable light shielding plate 3 covers the window 1a, and a stack of about 10 film units are disposed one on top of another in casing 1 under the shielding plate 3. Each film unit 4 consists of a printing portion composed of a lower, light sensitive sheet 5a and an upper, image receiving sheet 5b, and a rupturable bag containing a processing agent therein, the stack of film units 4 being urged upwardly by means of an underlying supporting spring 8 mounted on the bottom wall of the casing 1. In application, a cartridge is loaded in a camera, with the light shielding plate 3 left in a position to cover the window 1a, after which the light shielding plate 3 is extracted. After exposure, the topmost film unit 4 is engaged by a hook or extractor member (not shown) provided on the side of the camera so as to be fed to rollers as will be hereinafter described, the aforesaid hook being adapted to be inserted through a cut-away portion 6 formed in a side leg of the frame 2 proximate a corner thereof, whereby the film units 4 may be successively extracted from the top of the stack after each exposure.

The attachment of the instant embodiment is used with a film cartridge in a self-processing camera which is shown in FIG. 3. In this camera, the light from a photographic object which traverses the camera objective lens 16 is reflected downwardly by a reflecting mirror 10 and focussed on the focal plane of objective lens 16. Retaining means which hold the film cartridge which has been inserted in the casing 9 of the camera so that the top surface of the uppermost film unit of the stacked units is in a position lying in the focal plane of the objective lens 16. A pair of rollers 15 are adapted to be rotated by means of an electric motor (not shown) for extracting the light shielding plate 3 and successive film units 4 from the casing 1 and discharging them from the camera. When the bag 7 for the individual film unit 4 is pressed by the rollers 15 the processing solution is discharged between the photosensitive sheet 5a and the image receiving sheet 5b, thereby effecting developing and fixing processes.

Shown at 11 is the attachment of the first embodiment of the present invention, the attachment 11 consisting of a transparent plate, on the border of the top surface of which is printed a pattern or information 12 defined by indicating characters representing a date. As best shown in FIG. 3, the attachment 11 is of a size substantially the same as that of the window 1a in the film cartridge and outwardly directed ears or projections 11a, 11b, 11c and 11d are formed on the respective side edges of the plate and extended outwardly short distances from the side edges of the plate. The attachment has a cut-away portion 14 in one side at an end thereof so as not to interfere with the movement of a hook provided on the side of the camera for engaging and extracting a film unit 4, the aforesaid cut-away portion 14 corresponding to the cut-away portion 6 provided in one leg of the frame 2. The attachment 11 is mounted and retained in the frame 2 by utilizing the elastic deformation of the legs of the frame 2. In other words, when the attachment 11 is pressed or forced into the frame 2, then the projections 11a, 11b, 11c, 11d force the frame legs outwardly, such that the attachment 11 may be tightly held within the frame due to the restoring force of the frame 2 as well as the frictional force resulting from the aforesaid restoring force of the legs of the frame 2. The attachment 11, to great advantage, is mounted on the cartridge, before the cartridge is loaded in the casing 9 of the camera, with the light shielding plate 3 being in position on the top surface of the top film unit 4. The light shielding plate 3 is thus urged against the undersurface of the attachment 11 under the influence of supporting spring 8. When the light shielding plate 3 is extracted, the film unit which advances to the top has its top face abutting the attachment.

When a picture exposure is effected with the cartridge carrying the attachment 11 being held by the retaining means 17a and 17b within the casing 9 of the camera, the light from a photographic object traversing the objective lens 16 is reflected by the reflecting mirror 10 and passes through the attachment 11 having the pattern 12 printed thereon to effect the exposure of the unmasked top film unit 4. As a result, the image of the pattern 12 is superimposed on the image of a photographic object on the image receiving sheet 5b of the film unit 4. It should be noted that the film unit 4 is so disposed as to have the image receiving sheet 5b face upwardly for receiving an image, such that the image which has been reversed with respect to orientation by passing through the objective lens 16 is again reversed through reflection by the reflecting mirror 10. Thus, the result is that the attachment 11 is mounted in the package in a manner that the normal pattern 12 of the characters are shown in a normal arrangement thereon, as shown in FIGS. 2 and 3.

FIG. 4 illustrates the embodiment above described, having various patterns, in which the attachment 11 (a) is used to superimpose a date on the image of a person on the film unit 4, showing the pattern 12 including characters such as numbers. These numbers are printed with ink which may be wiped off with a cloth and thus may be erased for the subsequent application of other information, such as by printing.

The attachment 11 (b) represents the case where the image of a person is intentionally diffused or made obscure, the transparent plate forming the attachment having smoothly curved parallel corrugations on one surface. The attachment 11 (c) is used, for example, for photographing wave forms or traces on an oscilloscope, and carries a pattern 12 in the form of a grid parallel lines arranged in quadrature and serving as reference lines when printed on the printing paper.

With the use of the attachment 11 there arises a problem when the attachment 11 is mounted on the cartridge, in that the light incident on the attachment 11 is refracted by the transparent plate, such that the focal plane of the objective lens 16 is slightly axially shifted. However, if the focal depth of the objective lens 16 is substantially great, then the deviation on the focal plane is of no consequence. This problem may be readily solved by the embodiments shown in FIGS. 5 and 6.

The attachment 11' as shown in FIGS. 5 and 6, consists of a transparent plate carrying a pattern 12 on its one surface as in the previous embodiment, and is of a size substantially the same as that of the window 1a of the cartridge. This feature is commonly applied to the embodiments hereinafter described. With the modified attachment 11', ears or projections 11'a and 11'b are provided on and symmetrically spaced along a first common side edge proximate the ends thereof and a projection 11'c is provided on the side edge of the attachment opposite to the first side edge, in the center thereof. The undersurfaces of the projections 11'a, 11'b and 11'c are coplanar with one surface of the transparent plate, with the thickness of those projections being less than that of the transparent plate. The thickness of the projections 11'a, 11'b and 11'c is determined by the following formulae:

$$t - \delta = d = t/n,$$

Thus, $\delta = (n/-1) \cdot t/n$, wherein $\delta$ represents the thickness of projections 11'a, 11'b and 11'c, 't' represents the thickness of the transparent plate and 'n' represents its refractive index. In this case, an object positioned on the transparent plate at a depth 't' is viewed at the depth of $t/n$.

For mounting the attachment 11' to the cartridge, the projections 11'a and 11'b are first inserted in engagement with the underside of the corresponding edge 2a of the frame 2, and then the frame 2 is manually outwardly expanded by applying a proper force thereto, after which the projection 11'c on the opposite side is inserted into engagement with the underside of the corresponding edge 2a of the frame 2. The applied attachment 11' is urged by the film unit 4 under the influence of spring 8, whereby the top surfaces of the projections 11'a, 11'b and 11'c are brought into uniform film abuttment with the undersurfaces of the edges 2a of the frame 2. As a consequence the uppermost film unit 4 is located in a position shifted downwardly a distance corresponding to the thickness $\delta$ of projections 11'a, 11'b and 11'c against the influence of spring 8. The light from an object, which has traversed the objective lens 16 and reflected by the surface of the reflecting mirror 10 and in the absence of the attachment 11' would have been focussed on a plane L1 is, in the presence of attachment 11' focussed on plane L2 on the undersurface of the attachment 11', whereby the focussed light is received on the receiving sheet of the film unit which is resiliently urged against the undersurface of the attachment 11'. Accordingly, even if the focal depth of the objective lens 16 is small, a sharp image of an object on the film unit 4 will be obtained.

The attachment 11'' shown in FIG. 7 is similar in its function to that of the attachment 11' shown in FIGS. 5 and 6. In the attachment 11''', however, the projections 11'a, and 11'b of the attachment 11' are replaced by a lip or projection 11'''a extending for the full length of the corresponding plate edge. The shape of the cartridge 1' is illustrated as being different from that of the package 1. However, the cartridge 1' may also be used in a self-processing camera and the legs of the frame 2' delineating the window 1'a are elastically or resiliently transversely deformable when a suitable force is applied thereto, while a spring (not shown) is provided on the bottom thereof for urging the film unit contained in the package 1' upwardly. However, the film unit contained in the package is of the type that the photosensitive sheet is placed above the image receiving sheet and thus the image on the photosensitive sheet will be transferred to the image receiving sheet. In this respect, however, the image to be transferred onto the image receiving sheet is given as being reversed, such that the pattern to be printed on the top surface of the attachment 11'' should be reversed, as shown in the drawing.

Figure 8:
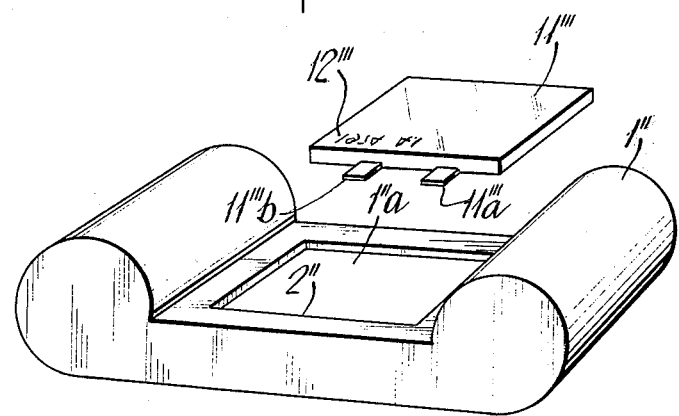
FIG. 8 is a perspective view showing an attachment of a fourth embodiment of the invention, together with an exchangeable cartridge containing a wound length of film.

The attachments of the present invention are applicable not only to a self-processing camera as shown in FIG. 3, but also to a camera (not shown) using a replaceable cartridge 1''', as shown in FIG. 8. The attachment 11'''' is of the same type and function as those shown in FIGS. 5 and 6. However, the camera using the package 11''' is of the type which directly focusses on the film plane the light from a photographic object and through the objective lens, such that the image projected on the film is reversed. Thus, the pattern printed on the top surface of the attachment 11''' should be reversed, as in the case with FIG. 7.

While preferred embodiments of the present invention have been described, these embodiments may be modified within the purview and scope of the claims which will be stated hereinafter, for instance, the attachment according to the present invention may consist of a colored transparent plate. Accordingly, the term 'transparent' as used herein is intended to encompass such a colored transparent plate.

Furthermore, for intentionally rendering obscure the image to be printed on the film, there may be used other transparent plates, such as one having on a surface thereof a plurality of pryamid projections which are regularly arranged or irregularly arranged minute concave or convex surface portions, or a plate which is frosted or ground.

We claim:

1. An attachment for use with a replaceable film cartridge having an exposure window comprising a transparent plate carrying information on a face thereof and substantially corresponding in size and shape to said window, and projections extending outwardly from opposite side edges of said plate and being flush with a surface of said transparent plate, the thickness of said projections being substantially equal to $(n-1).t/n$ wherein $t$ is the thickness of said transparent plate and $n$ is the index of refraction thereof.

2. The attachment of claim 1 wherein one of said projections is substantially coextensive in length with a corresponding edge of said transparent plate.

3. The attachment of claim 1 wherein said information comprises material extending in two dimensions on a face of said transparent plate and having a light transmissity differing from that of said plate.

4. The attachment of claim 1 wherein said information is defined by irregularities in the information bearing face of said transparent plate whereby to diffuse light traversing said plate.

5. In a camera including a casing and an objective lens, a replaceable film cartridge disposed in said casing and having a window exposed to light traversing said objective lens and containing a plurality of film units successively advanceable into registry with said window proximate the normal focal plane of said objective lens and an information bearing transparent plate carried by said cartridge in registry with said window and carrying means moving said film unit in registry with said window a distance from said focal plane substantially equal to $(n-1).t/n$ wherein t is the thickness of said transparent plate and n is the index of refraction thereof.

6. The camera of claim 5 wherein said transparent plate is in the form of an attachment which is selectively coupled to said cartridge in registry with said window.

7. In combination with a replaceable film cartridge having an exposure window and a flexibly deformable frame surrounding said exposure window and means for biasing film units contained in said cartridge towards said exposure window, an attachment comprising: a transparent plate carrying information on a surface thereof and substantially corresponding in size and shape to said exposure window; and projection means provided at opposite side edges of said transparent plate, said projection means being urged into engagement with the inside surface of said frame under the influence of said biasing means and positioning said plate in the direction perpendicular to said exposure window to move said film units from their biased position into said cartridge by an amount smaller than the thickness of said plate when said plate is inserted into said cartridge through said exposure window.

8. The attachment of claim 7 wherein said projection means includes projections formed at opposite side edges of said plate and having a thickness smaller than that of said plate, a surface of said respective projections being engaged with said inside surface of said frame when said plate is inserted into said cartridge through said window.

9. The attachment of claim 8 wherein a surface of said respective projection opposite to said surface thereof engageable with said inside surface of said frame is flush with a surface of said plate opposite to said surface carrying information thereon.

10. The attachment of claim 9 wherein the thickness of said projections is substantially equal to $(n-1).t/n$ where t is the thickness of said plate, and n is the index of refraction thereof.

11. The attachment of claim 9 wherein one of said projections is substantially co-extensive in length with a corresponding edge of said plate.

12. The attachment of claim 8 wherein said information comprises material extending in two dimensions on a face of said plate and having a transmissity differing from that of said plate.

13. The attachment of claim 8 wherein said information is defined by irregularities in the information bearing face of said plate whereby to diffuse light traversing said plate.

14. The attachment of claim 8, wherein said transparent plate has a cut-away portion at a corner thereof, whereby, when said cartridge is loaded within a camera said cut-away portion permits the passage of an extract member on said camera to engage with said film unit so that said extract member can extract film unit toward the outside of said camera after exposure of said film unit.

15. In combination with a replaceable film cartridge having an exposure window and a flexibly deformable frame surrounding said exposure window and means for biasing film units contained in said cartridge towards said exposure window, an attachment comprising a transparent plate markable with information on a surface thereof and substantially corresponding in size and shape to said exposure window; and projection means provided at opposite side edges of said transparent plate, said projection means being urged into engagement with the inside surface of said frame under the influence of said biasing means and positioning said plate in the direction perpendicular to said exposure window to move said film units from their biased position into said cartridge by an amount smaller than the thickness of said plate when said plate is inserted into said cartridge through said exposure window.

16. The attachment of claim 15 wherein said projection means includes a projections formed at opposite side edges of said plate and having a thickness smaller than that of said plate, a surface of said respective projections being engaged with said inside surface of said frame when said plate is inserted into said cartridge through said window.

17. The attachment of claim 16 wherein a surface of said respective projections opposite to said surface thereof engaging said inside surface of said frame is flush with a surface of said plate opposite to said surface markable with information thereon.

18. The attachment of claim 17 wherein the thickness of said projections is substantially equal to $(n-1).t/n$ /n where t is the thickness of said plate, and n is the index of refraction thereof.

19. The attachment of claim 17 wherein one of said projections is substantially co-extensive in length with a corresponding edge of said plate.

20. The attachment of claim 19, wherein said transparent plate has a cut-away portion at a corner thereof, whereby, when said cartridge is loaded within a camera said cut-away portion permits the passage of an extract member on said camera to engage with said film unit so that said extract member can extract film unit toward the outside of said camera after exposure of said film unit.

* * * * *